United States Patent
Hoang

(10) Patent No.: US 10,767,784 B2
(45) Date of Patent: Sep. 8, 2020

(54) GATE VALVE WITH PNEUMATIC SYSTEM FOR SHEARING APPLICATION

(71) Applicant: Cameron International Corporation, Houston, TX (US)

(72) Inventor: Loc Gia Hoang, Houston, TX (US)

(73) Assignee: Cameron International Corporation, Houston, TX (US)

(*) Notice: Subject to any disclaimer, the term of this patent is extended or adjusted under 35 U.S.C. 154(b) by 28 days.

(21) Appl. No.: 14/092,812

(22) Filed: Nov. 27, 2013

(65) Prior Publication Data

US 2015/0144816 A1    May 28, 2015

(51) Int. Cl.
| | |
|---|---|
| *F16K 31/122* | (2006.01) |
| *F16K 3/02* | (2006.01) |
| *E21B 34/02* | (2006.01) |
| *E21B 29/04* | (2006.01) |

(52) U.S. Cl.
CPC .......... *F16K 31/1221* (2013.01); *E21B 29/04* (2013.01); *E21B 34/02* (2013.01); *F16K 3/02* (2013.01); *F16K 3/0254* (2013.01)

(58) Field of Classification Search
USPC ......... 251/326–328, 1.1, 1.3; 166/54.5, 54.6, 166/385, 94.3; 83/694
See application file for complete search history.

(56) References Cited

U.S. PATENT DOCUMENTS

| | | | | |
|---|---|---|---|---|
| 4,095,421 A | * | 6/1978 | Silcox ................. | E21B 33/0355 137/236.1 |
| 4,103,702 A | * | 8/1978 | Duthion et al. ............. | 137/375 |
| 4,294,284 A | * | 10/1981 | Herd ............................. | 137/613 |
| 4,311,297 A | * | 1/1982 | Barrington .............. | E21B 34/04 137/236.1 |
| 4,773,440 A | * | 9/1988 | Yanagawa et al. ........... | 137/242 |
| 4,809,733 A | * | 3/1989 | Hawkins ................. | E21B 34/02 137/236.1 |
| 4,877,217 A | * | 10/1989 | Peil ....................... | E21B 33/062 251/1.3 |
| 4,885,981 A | * | 12/1989 | Roettger et al. .................. | 92/59 |
| 4,911,410 A | * | 3/1990 | Baker ........................... | 251/327 |
| 5,487,527 A | * | 1/1996 | Eggleston ........... | F16K 31/1228 251/285 |
| 6,125,874 A | | 10/2000 | Holliday | |
| 6,598,849 B2 | * | 7/2003 | Hoang .................... | E21B 21/10 251/62 |
| 7,744,060 B2 | * | 6/2010 | Sneh .............................. | 251/46 |
| 7,913,971 B2 | * | 3/2011 | Hoang ........................... | 251/14 |
| 8,888,068 B2 | * | 11/2014 | Hoang et al. ................. | 251/195 |

(Continued)

FOREIGN PATENT DOCUMENTS

| | | |
|---|---|---|
| EP | 0416719 A1 | 3/1991 |
| WO | 2012093312 A1 | 7/2012 |

OTHER PUBLICATIONS

International Search Report & Written Opinion for PCT Application No. PCT/US2014/066217 dated Sep. 22, 2015, 13 pages.

*Primary Examiner* — Daphne M Barry
(74) *Attorney, Agent, or Firm* — Fletcher Yoder, P.C.

(57) ABSTRACT

Embodiments of the present disclosure are directed toward a second pneumatic actuator configured to couple to a gate valve, wherein the second pneumatic actuator is configured to apply a supplemental force to a gate of the gate valve, wherein the supplemental force supplements an actuating force of a first actuator of the gate valve.

16 Claims, 6 Drawing Sheets

(56) References Cited

U.S. PATENT DOCUMENTS

2010/0229975 A1* 9/2010 Sweeney .............. F15B 19/005
137/556
2011/0155250 A1* 6/2011 Nannan .................... F15B 9/03
137/1

* cited by examiner

US 10,767,784 B2

GATE VALVE WITH PNEUMATIC SYSTEM FOR SHEARING APPLICATION

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In certain applications, a structure (e.g., a wireline or tubing) may obstruct closure of a valve, such as a gate valve. Under certain conditions, it may be desirable to cut the wireline or tubing to enable closure of the valve, while retaining the valve's sealing integrity over an extended period of use.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure include a gate valve having an actuator with a pneumatic system. More specifically, the actuator includes a pneumatic system configured to create a supplemental force to supplement an actuation force generated by an actuation system of the actuator. For example, the pneumatic system may use a pressurized gas (e.g., air, nitrogen, or another inert gas) to create the supplemental force acting on the actuation system (e.g., spring-biased actuator, electrical actuator, magnetic actuator, or any combination thereof). In this manner, the supplemental force may cooperate with the actuation force generated by the actuation system to improve actuation of the gate valve. In certain embodiments, the pneumatic system may be added to existing gate valve designs to improve operation of the gate valves without increasing the size of existing gate valve actuators.

Figure 1:
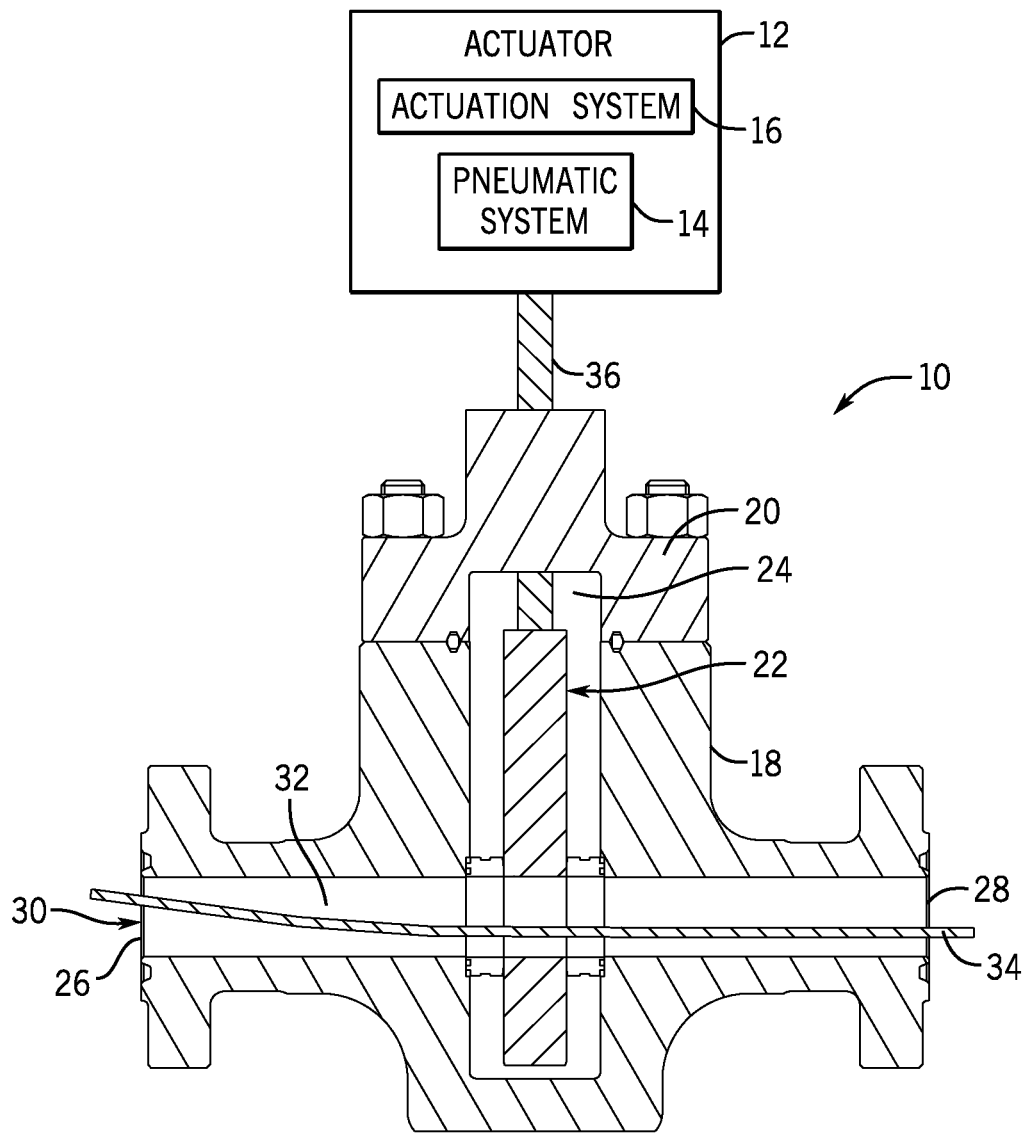
FIG. 1 is a schematic diagram of an exemplary gate valve having an actuator with a pneumatic system.

FIG. 1 illustrates an embodiment of a gate valve 10 having an actuator 12 and a pneumatic system 14. Specifically, the pneumatic system 14 of the actuator 12 may supplement another actuation system (e.g., actuation system 16) of the actuator 12. For example, the actuation system 16 of the actuator 12 may be a spring, a hydraulic piston, or other actuation system (e.g., spring-biased actuator, electrical actuator, magnetic actuator, or any combination thereof). In the manner described below, the pneumatic system 14 enables the use of the gate valves 10 (e.g., existing gate valves) with large bores and/or high pressures or any other combination of bore size and operating pressure using the actuation system 16, while reducing the amount of mechanical force or torque needed to open and close the gate valve 10. In other words, the pneumatic system 14 generates a supplemental actuation force to supplement an actuation force applied to the gate valve 10 by the actuation system 16. As a result, operation of the gate valve 10 may be improved without increasing the size of the actuation system 16.

The gate valve 10 is generally configured to control a flow of fluid through the gate valve 10 in various applications. For example, the gate valve 10 may be employed in applications relating to oil and gas industries, power generation industries, petrochemical industries, and the like. In oilfield applications, the gate valve 10 may be coupled to a Christmas tree (not shown) that controls the extraction of production fluid from a well. The gate valve 10 has a bore (e.g., bore 30) that may be sized for the given application. For example, the bore of the gate valve 10 may be at least approximately 3 inches in diameter. In other embodiments, the gate valve 10 includes a smaller bore that may be less than approximately 5 inches. In certain embodiments, the gate valve 10 is configured to operate at a high pressure of at least approximately 10,000 pounds per square inch (psi). In some embodiments, the gate valve 10 is configured to operate at pressure lower than approximately 10,000 psi. Additionally, in certain embodiments, the gate valve 10 may be used to shear a wireline, coil tubing, or other obstruction. That is, the gate valve 10 may be configured to apply a shearing force to break the obstruction and allow for travel of a gate 22.

As mentioned above, the gate valve 10 includes the actuator 12 having the pneumatic system 14 and the actuation system 16. For example, the actuation system 16 may be a spring, a hydraulic piston, or other actuation system. The pneumatic system may include an air accumulator, a shop air source, a pressurized bladder disposed about the actuator 12, a compressor, a motorized piston, or other gas source. The actuator 12 is coupled to a body 18 of the gate valve 10. For example, the actuator 12 may be coupled to a top portion of the body 18 via a bonnet 20. Alternatively, the gate valve 10 may include a single body coupled to the actuator 12. The body 18 may be constructed of cast iron, ductile iron, cast carbon steel, gun metal, stainless steel, alloy steels, corrosion resistant alloys, and/or forged steels. The gate valve 10 includes the gate 22 disposed within a cavity 24 of the body 18, and the gate 22 is configured to move between an open position and a closed position within the cavity 24. As illustrated, the gate 22 is disposed in the open position. The body 18 of the gate valve 10 includes an inlet 26 and an outlet 28 configured for a flow of a fluid through a bore 30 of the body 18 into a passage 32 of the gate valve 10. In certain embodiments, the outlet 28 may act as an inlet allowing fluid flow into the passage 32 from either side of the gate valve 10. For example, in some embodiments, the inlet 26 may act as an outlet and the outlet 28 may act as an inlet.

Additionally, as mentioned above, the gate valve 10 may be configured to shear a wireline, coil tubing, or other tubular member. In the illustrated embodiment, a wireline 34 extends through the bore 30 and the passage 32 of the body 18 of the gate valve 10. In the manner described in detail below, when the gate 22 of the gate valve 10 moves from an opened position to a closed position, the gate 22 shears the wireline 34, thus allowing the gate 22 to close without removing the obstruction, here the wireline 34.

The gate valve 10 is configured to open and close in response to an actuation force from the actuator 12. In particular, the actuation system 16 applies a force (e.g., a linear force) to a stem 36 coupling the gate 22 to the actuator 12. Additionally, the pneumatic system 14 applies a supplemental force (e.g., supplemental linear force) to increase the overall force of the actuator 12 acting on the stem 36. In this manner, the operation of the gate valve 10 may improve. As discussed in detail below, the actuator 12 may be controlled such that only the pneumatic system 14 is used to actuate the gate valve 10, only the actuation system 16 is used to actuate the gate valve 10, or both the pneumatic system 14 and the actuation system 16 are used to actuate the gate valve 10. In other words, the actuator 12 may have multiple modes of operation.

Figure 2:
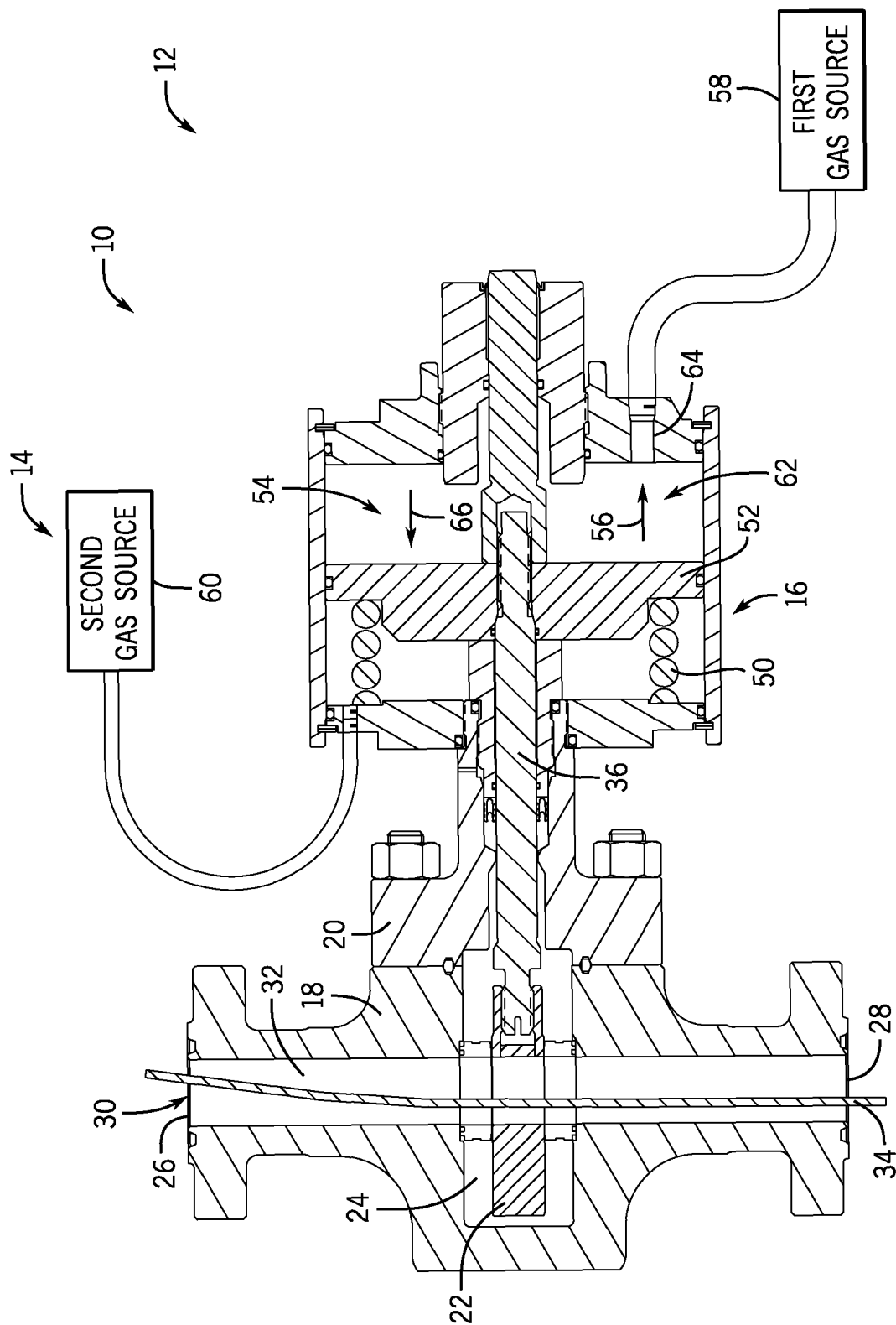
FIG. 2 is a schematic diagram of another embodiment of the gate valve having the actuator with the pneumatic system.

FIG. 2 illustrates an embodiment of the gate valve 10 having the actuator 12 with the pneumatic system 14, illustrating the gate valve 10 in an opened position. In the illustrated embodiment, the actuation system 16 of the actuator 12 includes a spring 50 biased against a piston 52 within a piston chamber 54. In operation, the spring 50 biases the piston 52 in a direction 56, thereby urging the gate 22 from the opened position to the closed position shown in FIG. 3.

As mentioned above, the actuator 12 also includes the pneumatic system 14, which may supplement the actuation system 16. For example, the actuator 12 may have multiple modes of operation where the actuation system 16 is operated, the pneumatic system 14 is operated, or both the actuation system 16 and the pneumatic system 14 are operated to actuate the gate valve 10. In illustrated embodiment, the pneumatic system 14 includes a first gas source 58 and a second gas source 60. However, in other embodiments, the first gas source 58 may be a hydraulic or electric system configured to apply a force. The first and second gas sources 58 and 60 may include air accumulators, shop air sources, pressurized capsules or vessels, or other gas sources suitable for supplying a pressurized air. The first gas source 58 supplies a pressurized gas to the piston chamber 54 on a first side 62 of the piston 52 through a port 64 of the actuator 12. In particular, the first gas source 58 may supply a pressurized gas to the first side 62 of the piston 52 in order to bias the piston 52 in a direction 66, thereby compressing the spring 50 and urging the gate 22 into the open position shown in FIG. 2. In certain embodiments, the first gas source 50 may supply a gas to the first side 62 of the piston 52 at a pressure of approximately 10 to 10000 psi, approximately 20 to 5000 psi, approximately 30 to 1000 psi, approximately 40 to 500 psi, or approximately 50 to 100 psi.

Figure 3:
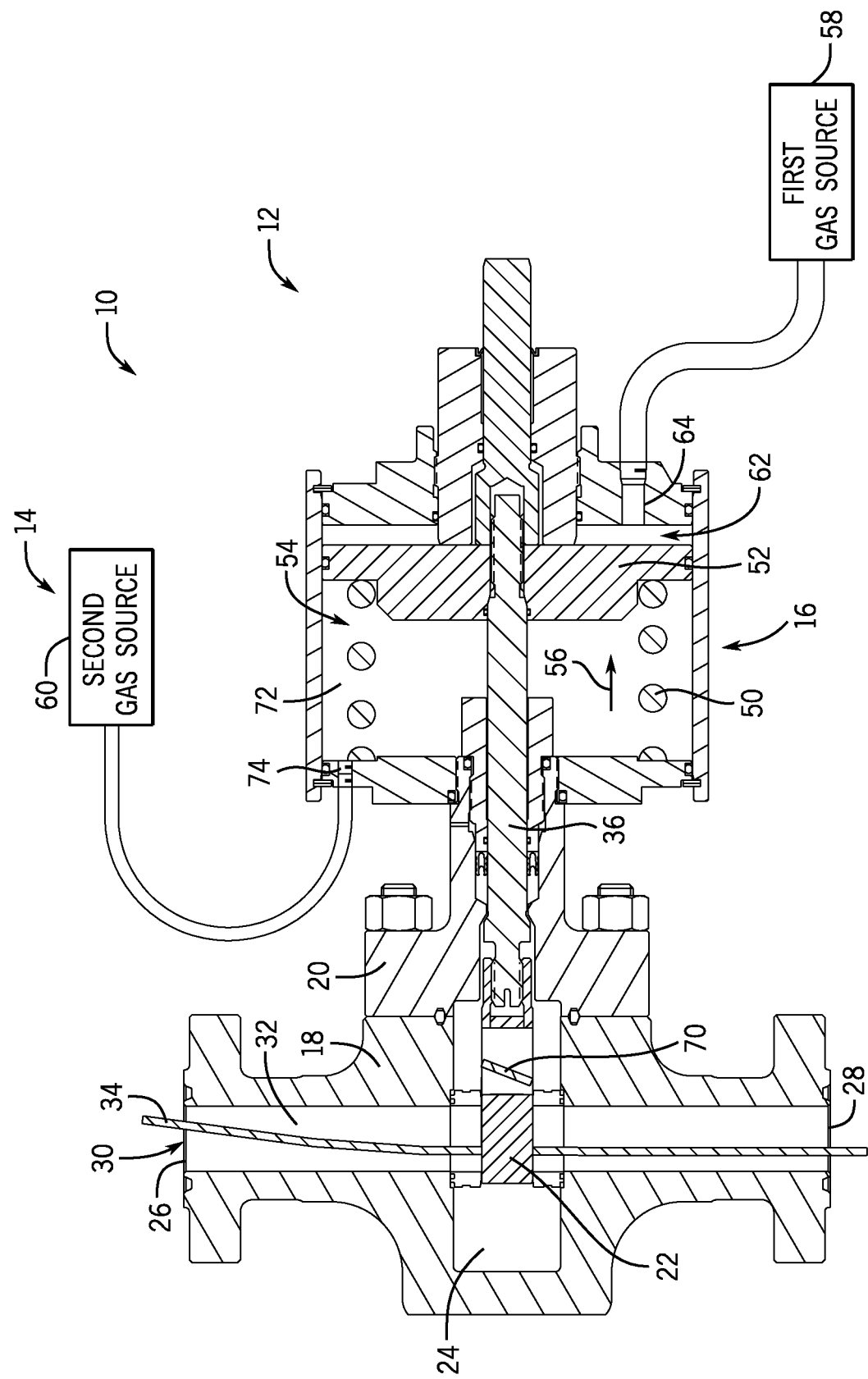
FIG. 3 is a schematic diagram of an embodiment of the gate valve having the actuator with the pneumatic system.

FIG. 3 illustrates an embodiment of the gate valve 10 having the actuator 12 with the pneumatic system 14, illustrating the gate valve 10 in a closed position. In the illustrated embodiment, the first gas source 58 (or hydraulic or electric power source) may be shut off. As a result, the spring 50 biased against the piston 52 force the piston 52 in the direction 56, thereby pushing the fluid (e.g., gas or hydraulic fluid) on the first side 62 of the piston chamber 54 out of the piston chamber 54 through the port 64. The gate valve 10 then moves into the closed position shown. That is, the gate 22 moves through the passage 32 of the gate valve 10 and shears the wireline 34. In the illustrated embodiment, the gate 22 shears the wireline 34 in two places, thus breaking the wireline 34 and creating a separate sheared portion 70 of the wireline 34. However, in other embodiments, the gate 22 may shear the wireline 34 in one location.

As mentioned above, the pneumatic system 14 of the actuator 12 may supplement the force generated by the actuation system 16. In the illustrated embodiment, the second gas source 60 of the pneumatic system 14 may supplement the force exerted on the piston 52 by the spring 50 of the actuation system 16. More specifically, the second gas source 60, which may be an air accumulator, shop air supply, or other gas source, may supply a pressurized gas into a second side 72 of the piston chamber 54 through a port 74 of the actuator 12. The pressurized gas from the second gas source 60 and the spring 50 may combine to bias the piston 52 in the direction 56, thereby urging the gate 22 into the closed position as shown. In the closed position, the gate 22 may shear the wireline 34 and block fluid flow through the passage 32 of the gate valve 10. The first gas source 58 may supply a gas to the first side 62 of the piston 52 at a pressure of approximately 10 to 10000 psi, approximately 20 to 5000 psi, approximately 30 to 1000 psi, approximately 40 to 500 psi, or approximately 50 to 100 psi. The gas pressures applied by the first gas source 58 and the second gas source 60 may be regulated to further control actuation of the gate valve 10. That is, the gas pressures applied by the first gas source 58 and the second gas source 60 may be regulated to supplement the actuation system 16 and further control the position of the gate 22 (e.g., between the opened and closed positions).

By supplementing the force applied to the gate 22 by the actuation system 16 with a supplemental force generated by the pneumatic system 14, the size or strength of the actuation system 16 may be reduced. In this manner, greater forces may be applied to the gate 22 during operation of the gate valve 10 without increasing the size or design of the actuation system 14. As a result, in certain embodiments, the pneumatic system 14 may be applied to existing gate valve 10 designs, thereby improving operation of existing gate valves 10. For example, the pneumatic system 14 may improve operation of the gate valve 10 in emergency circumstances, or other circumstances when accelerated operation of the gate valve 10 is desirable.

Figure 4:
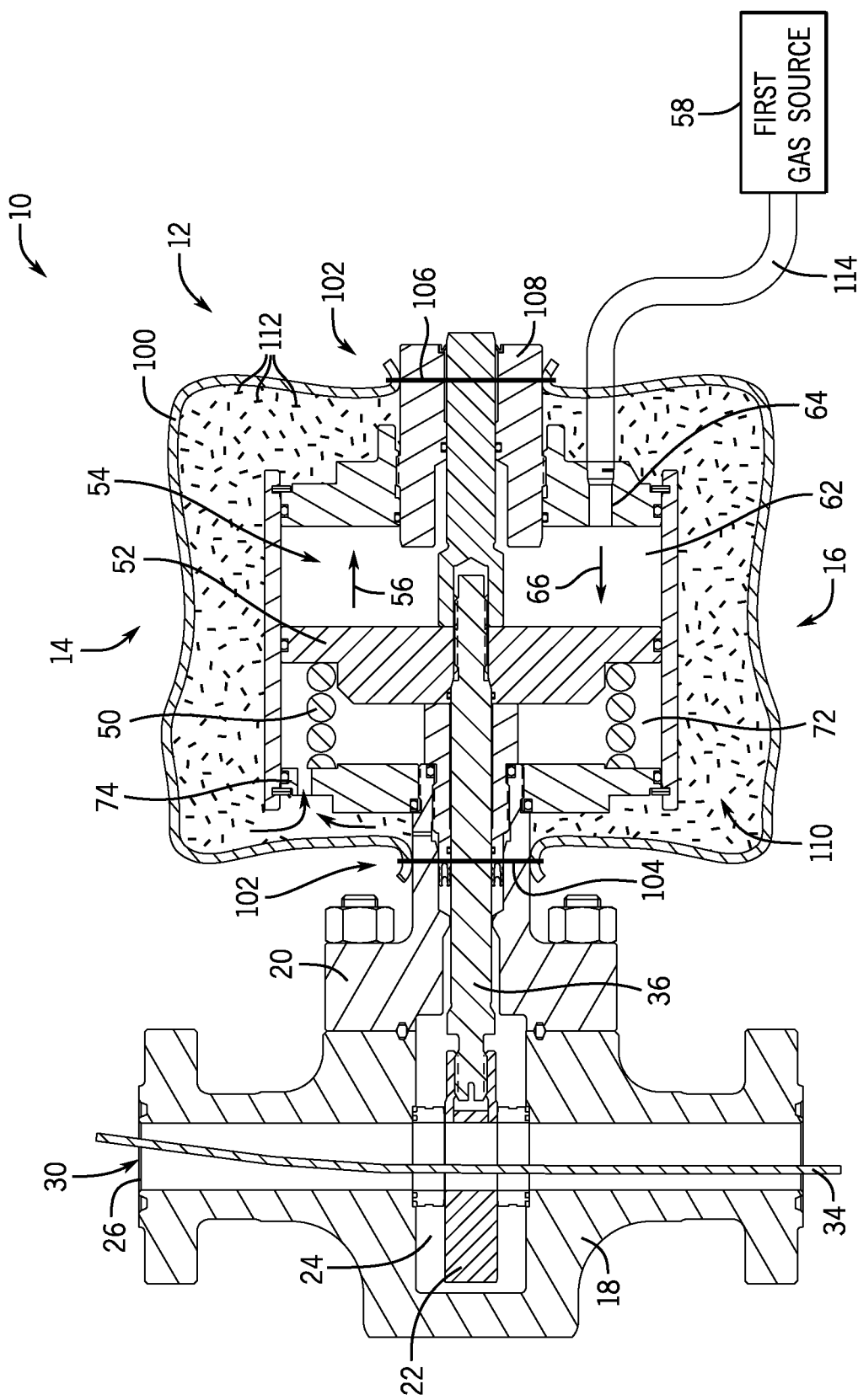
FIG. 4 is a schematic diagram of an embodiment of the gate valve having the actuator with the pneumatic system.

FIG. 4 illustrates an embodiment of the gate valve 10 having the actuator 12 with the pneumatic system 14 having a pre-charged (e.g., pressurized) bladder 100 disposed about the actuation system 16. As shown, the bladder 100 clamped or secured about the actuation system 16 with clamps 102. A first clamp 104 clamps one end of the bladder 100 to the bonnet 20 of the gate valve 10, and a second clamp 106 clamps another end of the bladder 100 to a collar 108 of the gate valve 10. As such, the bladder 100 defines a sealed volume 110 about the actuation mechanism 16.

As mentioned above, the bladder 100 may be pre-charged or pressurized with a gas 112. That is, the sealed volume 110 of the bladder 100 may be filled with the gas 112. The sealed volume 110 of the bladder 100 is exposed to the second side of the piston chamber 54 by the port 74. Accordingly, the pressurized gas 112 within the sealed volume 110 of the bladder 100 may enter the piston chamber 54 and exert a force on the piston 52 in the direction 56, thereby biasing the gate 22 towards the closed position shown in FIG. 3. The force exerted on the piston 52 by the gas 112 is combined with the force acting on the piston 52 by the spring 50. As such, the pressurized gas 112 supplements the actuation force of the spring 50, thereby increasing the overall force acting on the gate 22. In this manner, operation of the gate valve 10 may be improved. For example, the actuation system 16 and the pneumatic system 14 may combine to apply a greater shearing force to the wireline 34 with the gate 22, thereby enabling shearing of the wireline 34 and/or more easily shearing the wireline 34 and improving gate valve 10 performance.

In addition to the pre-charged bladder 100 disposed about the actuation system 16, the pneumatic system 14 in the illustrated embodiment also includes the first gas source 58. The first gas source 58 supplies a pressurized gas (e.g., a control pressure) to the first side 62 of the piston chamber 54 through the port 64 of the actuation system 16. In the present embodiment, the gas supplied by the first gas source 58 is supplied to the port 64 by a conduit 114 (e.g., a hose) that extends through the bladder 100. The conduit 114 and bladder 100 may be formed as a single or integrated piece. As, the first gas source 58 supplies pressurized gas to the first side 62 of the piston chamber 54, the pressurized gas exerts a force on the piston 52 in the direction 66, thereby urging the gate 22 towards the opened position. The gas pressure applied by the first gas source 58 may be regulated to control the position of the gate 22 (e.g., between the opened and closed positions).

Figure 5:
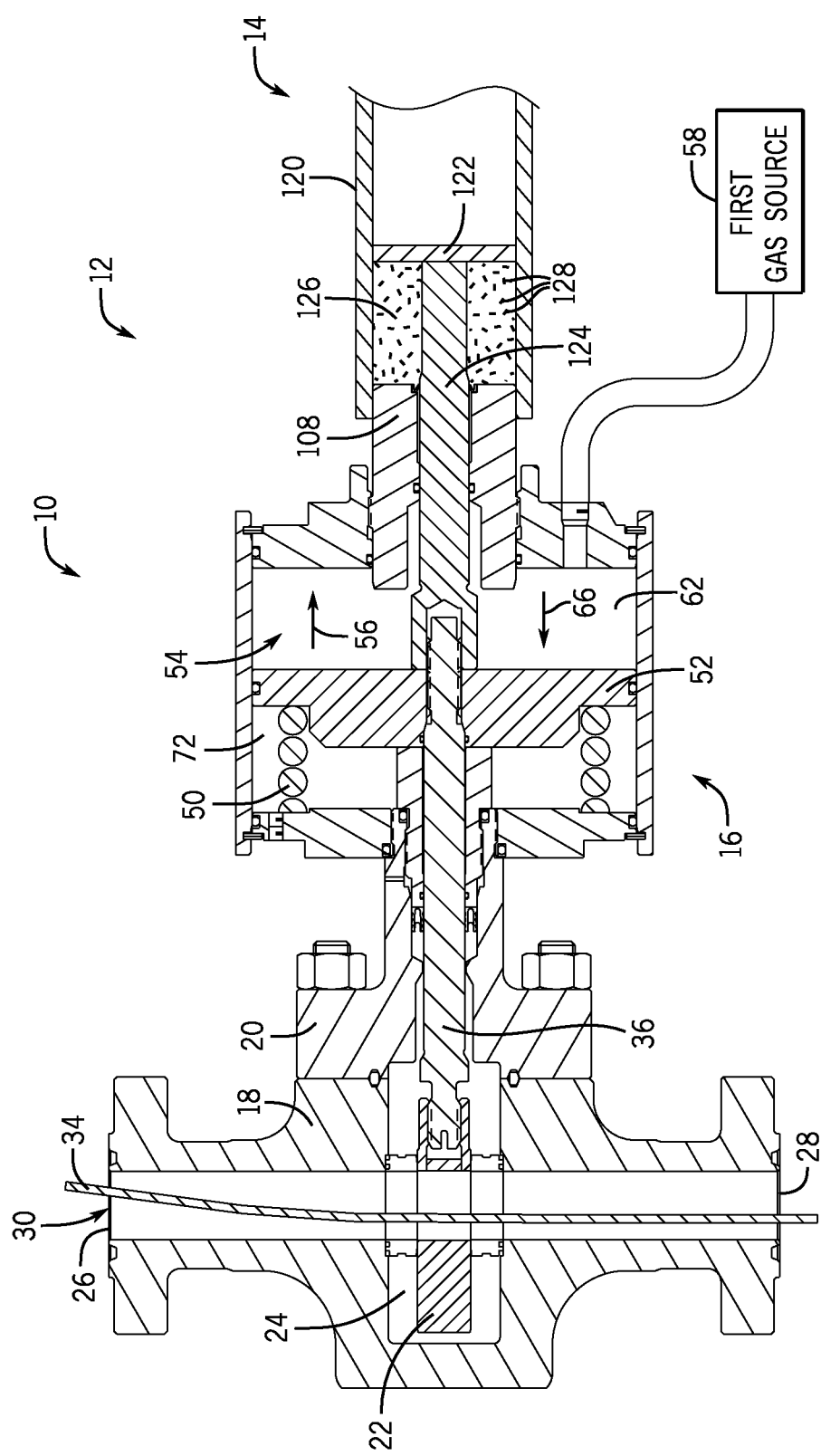
FIG. 5 is a schematic diagram of an embodiment of the gate valve having the actuator with the pneumatic system.

FIG. 5 illustrates another embodiment of the gate valve 10 having the actuator 12 with the pneumatic system 14. In the illustrated embodiment, the pneumatic system 14 includes a charged piston system 120 added onto the collar 108 of the gate valve 10. More specifically, the charged piston system 120 includes a piston 122 coupled to a valve stem 124 of the gate valve 10. The charged piston system 120 includes a piston chamber 126 that is charged (i.e., pressurized) with a pressurized gas 128. The pressurized gas 128 biases the piston 122 of the charged piston system 120 in the direction 56. As the valve stem 124 of the gate valve 10 is coupled to the piston 52 of the actuation system 16, the pressurized gas 128 also biases the piston 52 in the direction 56, thereby urging the gate 22 towards the closed position. Additionally, the force exerted by the pressurized gas 128 on the piston 122 is combined with the force exerted on the piston 52 by the spring 50 of the actuation system 16. As such, the charged piston system 120 and the actuation system 16 cooperatively urge the gate 22 towards the closed position.

Furthermore, the illustrated embodiment includes the first gas source 58. As similarly described above, the first gas source 58 supplies pressurized gas (e.g., a control pressure) to the first side 62 of the piston chamber 54 to exert a force on the piston 52 in the direction 66, thereby urging the gate 22 towards the opened position. As such, in the manner described below, the gas pressure applied by the first gas source 58 may be regulated to control the position of the gate 22 (e.g., between the opened and closed positions).

Figure 6:
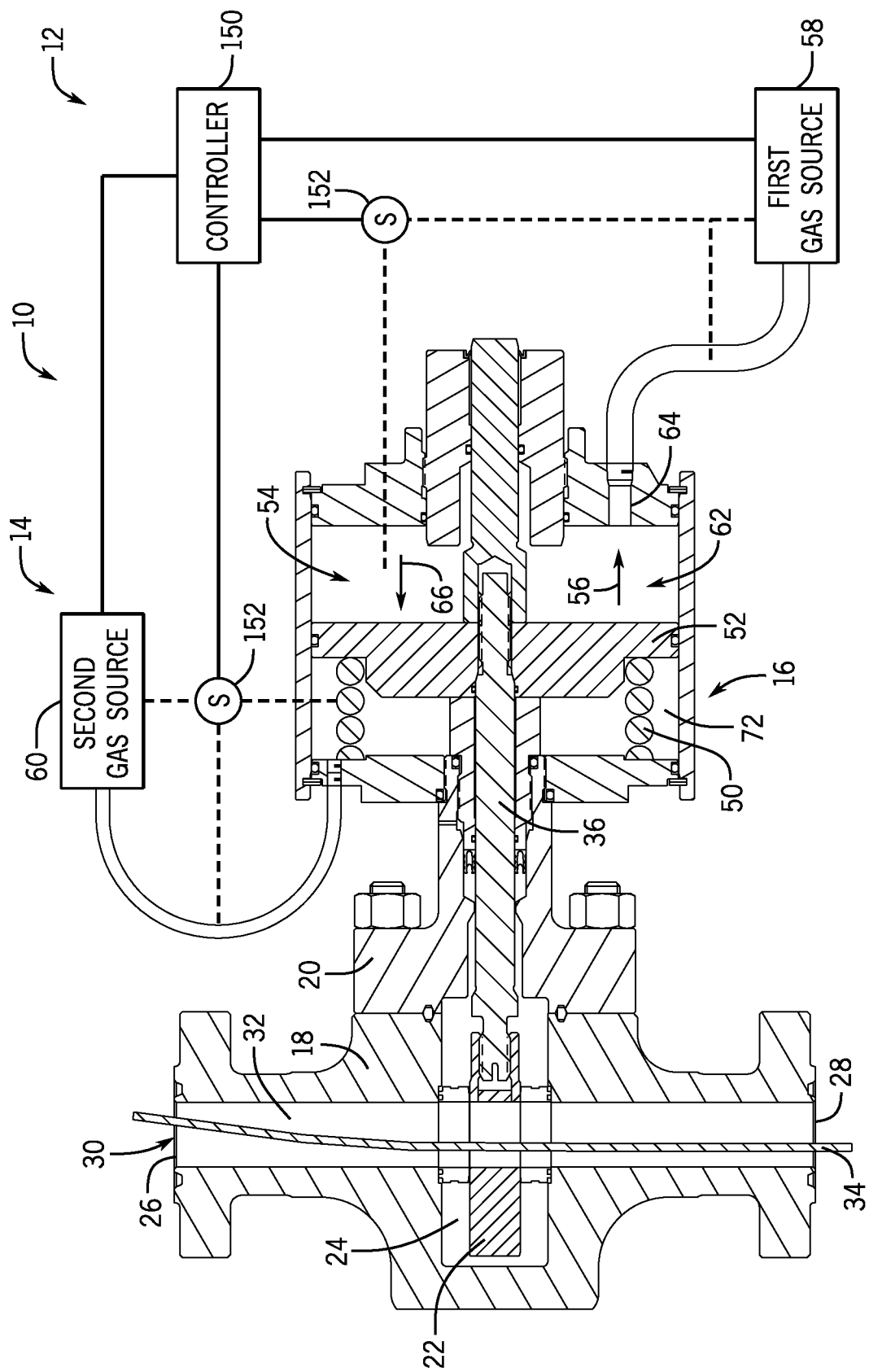
FIG. 6 is a schematic diagram of an embodiment of the gate valve having the actuator with the pneumatic system.

FIG. 6 illustrates an embodiment of the gate valve 10 having the actuator 12 with the pneumatic system 14, illustrating a controller 150 configured to regulate operation of the gate valve 10. Specifically, the controller 150 may be configured to regulate the pressure of gas supplied by the first and/or second gas sources 58 and 60 to the piston chamber 54. In this manner, the controller 150 may regulate operation of the gate valve 10. That is, the controller 150 may regulate the position of the gate 22 of the gate valve 10 (e.g., between open and closed positions). To this end, the controller 150 may be configured to regulate operation of valves or other flow control devices of the first and second gas sources 58 and 60 to regulate the pressure or flow of gas to the first and second sides 62 and 72 of the piston chamber 54. For example, to actuate the gate valve 10 in an opened position, the controller 150 may operate to increase flow and/or pressure of gas supplied to the first side 62 of the piston chamber 54 by the first gas source 58. The controller 150 may operate to reduce flow and/or pressure of gas supplied to the second side 72 of the piston chamber 54 by the second gas source 60. More specifically, the controller 150 may control the first and second gas sources 58 and 60 such that the force acting on the piston 52 generated by the gas supplied by the first gas source 58 (e.g., in the direction 66) is greater than the force acting on the piston 52 generated by the spring 50 and the gas supplied by the second gas source 60 (e.g., in the direction 56). As a result, the piston 52 will be urged in the direction 66, thereby opening the gate valve 10.

Similarly, to actuate the gate valve 10 in a closed position, the controller 150 may operate to increase flow and/or pressure of gas supplied to the second side 72 of the piston chamber 54 by the second gas source 60. Additionally, the controller 150 may operate to reduce flow and/or pressure of gas supplied to the first side 62 of the piston chamber 54 by the first gas source 58. The controller may control the first and second gas sources 58 and 60 such that the force acting on the piston 52 generated by the gas supplied by the first gas source 58 (e.g., in the direction 66) is less than the force acting on the piston 52 generated by the spring 50 and the gas supplied by the second gas source 60 (e.g., in the direction 56). As a result, the piston 52 will be urged in the direction 56, thereby closing the gate valve 10 and shearing the wireline 34.

Furthermore, in certain embodiments, the controller 150 may regulate operation of the first and/or second gas sources 58 and 60 based on feedback, such as feedback from sensors 152. For example, the sensors 152 may be temperature sensors, position sensors, pressure sensors, and so forth. In certain embodiments, one or more of the sensors 152 may be configured to measure a pressure within the first side 62 of the piston chamber 54, the second side 72 of the piston chamber 54, the first gas source 58, the second gas source 60, and so forth.

The controller 150 may be further configured to regulate different modes of operation of the actuator 12. For example, in certain circumstances (e.g., normal operation of the actuator 12), the controller 150 may be configured to operate only the actuation system 16 to actuate the gate valve 10. Similarly, in other circumstances (e.g., if the actuation system 16 fails), the controller 150 may operate only the pneumatic system 14 to actuate the gate valve 10. In temporary, emergency, or unusual conditions, the controller 150 may be configured to operate both the pneumatic system 14 and the actuation system 16 to actuate the gate valve 10. The controller 150 may be remotely controlled (e.g., at the surface) to operate the actuator 12 (e.g., the pneumatic system 14 and/or the actuation system 16).

Embodiments of the present disclosure include the gate valve 10 having the actuator 12 with the pneumatic system 14. More specifically, the actuator 12 includes the pneumatic system 14 configured to create a supplemental force to supplement an actuation force generated by the actuation system 16 of the actuator 12. For example, the pneumatic system 14 may use a pressurized gas to create the supplemental force acting on the actuation system 16. The supplemental force may cooperate with the actuation force generated by the actuation system 16 to improve actuation of the gate valve 10. In certain embodiments, the pneumatic system 14 may be added to existing gates valve 10 designs to improve operation of the gate valves 10 without increasing the size of existing gate valve actuation systems 16.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a gate valve, comprising:
a body comprising a cavity disposed along a fluid flow path, wherein the fluid flow path is configured to receive a line extending lengthwise along the fluid flow path;
a gate configured to move across the fluid flow path into the cavity between an open position and a closed position to shear the line;
a first actuator comprising at least one spring configured to bias the gate towards the closed position with a biasing force, wherein the at least one spring is undersized such that the biasing force is insufficient to enable the gate to shear through the line;
a first piston coupled to a shaft and to the first actuator on a first side of the first piston;
a first fluid actuator comprising a second piston and a first pressurized gas configured to apply a first supplemental pneumatic force against the second piston in a common direction with the biasing force to move the gate towards the closed position, and the second piston couples to the shaft;
a second fluid actuator comprising a storage of a second pressurized gas configured to apply a second supplemental pneumatic force against the first piston in the common direction with the biasing force to move the gate towards the closed position; and
a controller configured to control release of the second pressurized gas from the storage to provide the second supplemental pneumatic force that combines with the biasing force to create a cumulative force, wherein the controller is configured to increase a pressure of the second pressurized gas until the cumulative force is sufficient to enable the gate to shear through the line and complete a movement from the open position to the closed position.

2. The system of claim 1, wherein the second fluid actuator comprises a first gas supply configured to apply a first gas pressure in the common direction with the biasing force and a second gas supply configured to apply a second gas pressure in an opposite direction of the biasing force.

3. The system of claim 1, wherein the line is a wireline.

4. The system of claim 1, wherein the gate valve has the first actuator and the second fluid actuator disposed internally within a sealed volume.

5. The system of claim 1, comprising:
a first pressure sensor configured to detect a first pressure on the first side of the first piston and emit a first signal indicative of the first pressure; and
a second pressure sensor configured to detect a second pressure on a second side of the first piston and emit a second signal indicative of the second pressure;
wherein the controller is configured to communicate with the first pressure sensor and the second pressure sensor, and the controller is responsive to the first and second signals to regulate the cumulative force to be sufficient to enable the gate to shear through the line and complete the movement from the open position to the closed position.

6. A system, comprising:
a valve assembly, comprising:
a body having a cavity disposed along a fluid flow path;
a valve member configured to move in the cavity between an open position and a closed position relative to the fluid flow path;
a first actuator comprising at least one spring configured to bias the valve member with a first force in a first direction between the open position and the closed position, wherein the at least one spring is undersized such that the first force is insufficient to enable the valve member to shear through an obstruction in the fluid flow path;
a first piston coupled to a shaft and to the first actuator on a first side of the first piston;
a second actuator comprising a second piston and a first pressurized gas configured to bias the valve member with a second force in the first direction between the open position and the closed position; and
a third actuator comprising a storage of a second pressurized gas configured to bias the valve member with a third force in the first direction between the open and the closed positions;
wherein the valve assembly is configured to provide a cumulative force that combines the first, the second, and the third forces of the respective first, second, and third actuators, and the valve assembly is configured to increase a pressure provided by the second pressurized gas until the cumulative force is sufficient to enable the valve member to shear through the obstruction and complete a movement from the open position to the closed position.

7. The system of claim 6, wherein the obstruction comprises a wireline or tubing disposed along the fluid flow path.

8. The system of claim 6, wherein the valve assembly has the first and second actuators disposed internally within respective sealed volumes.

9. The system of claim 6, wherein the first piston is disposed between a first fluid chamber and a second fluid chamber, and the first actuator is at least partially disposed in the first fluid chamber.

10. The system of claim 9, wherein the storage of the second pressurized gas comprises a first gas supply configured to regulate a first pressure of the first fluid chamber and a second gas supply configured to regulate a second pressure of the second fluid chamber.

11. The system of claim 10, comprising a controller configured to control the third actuator to bias the valve member with the third force in the first direction between the open position and the closed position by increasing the first pressure of the first fluid chamber and decreasing the second pressure of the second fluid chamber.

12. The system of claim 11, wherein the controller is configured to control the third actuator to bias the valve member with a second force in a second direction opposite the common direction between the open position and the closed position by decreasing the first pressure of the first fluid chamber and increasing the second pressure of the second fluid chamber.

13. The system of claim 9, wherein the first piston is coupled to the valve member with the shaft, the first actuator is disposed about the shaft and biases the first piston, the third actuator is configured to bias the first piston, and an outer wall extends around and seals a volume having the first and third actuators.

14. The system of claim 6, wherein the second actuator comprises a wall completely enclosing a pressurized gas chamber having the first pressurized gas.

15. A method, comprising:
adjusting a fluid flow path with a valve assembly having a valve member that moves through a cavity between an open position and a closed position relative to the fluid flow path;
biasing the valve member with a first force in a first direction between the open position and the closed position using a first actuator comprising at least one spring, wherein the at least one spring is undersized such that the first force is insufficient to enable the valve member to shear through an obstruction disposed along the fluid flow path;
biasing the valve member with a second force in the first direction between the open position and the closed position using a second actuator comprising a first pressurized gas;
biasing the valve member with a third force in the first direction between the open and closed positions using a third actuator comprising a second pressurized gas; and
controlling the valve assembly to provide a cumulative force that combines the first, the second, and the third forces of the respective first, second, and third actuators, wherein controlling comprises increasing a pressure provided by the second pressurized gas until the cumulative force is sufficient to enable the valve member to shear through the obstruction and complete a movement from the open position to the closed position.

16. The method of claim 15, wherein the second actuator comprises a wall completely enclosing a pressurized gas chamber having the first pressurized gas.

* * * * *